Patented Dec. 3, 1940

2,223,536

UNITED STATES PATENT OFFICE 2,223,536

UREA-FORMALDEHYDE CONDENSATION PRODUCT

Leonard Smidth, Houston, Tex.

No Drawing. Application March 2, 1935, Serial
No. 9,124. Renewed February 4, 1939

7 Claims. (Cl. 260—69)

The present invention relates to the production of tough, hard urea-formaldehyde condensation products of both final and intermediate reaction and also to the preparation of liquid intermediate urea-formaldehyde compounds or compositions of unusual stability which may be kept under ordinary conditions for considerable periods of time without gelatinization and which are capable of being quickly converted into stable, hard, glass-clear products which have little strain and upon aging do not spontaneously disintegrate or crack. These intermediate products may be cast or molded as such or be mixed with suitable fillers and converted into molding compositions which do not spontaneously set up or harden and which are capable of being converted in a period of only a few minutes into hard stable bodies by the combined action of heat and pressure. Such intermediate liquid products are also capable of being dissolved in suitable solvents to form solutions which are stable for indefinite periods of time, and such solutions utilized, for example, for laminating purposes, coating compositions, etc.

The urea-formaldehyde resins because of their clarity of glass, their colorlessness, and because they do not become colored on standing or exposure to sunlight or ultra-violet light, have attracted a great deal of attention and an enormous amount of work has been done on them as is evidenced by the large number of patents taken out all over the world. However, in spite of all this attention and as far as I may be able to determine, there has been no permanent glass-clear product that is made or can be made on a commercial scale. Successful castings of small size can be made but are of no value because of case hardening and spontaneous cracking on cutting.

During the aging of the urea-formaldehyde resin as produced by the prior art methods in which the form changes from a soft jelly to a hard substance there is a considerable loss in weight accompanied by shrinkage. The material lost during the hardening is largely made up of water together with possibly a slight amount of formaldehyde. The process is one akin to drying and accordingly starts at the surface, progressing to the center, but after the outside skin becomes hardened and shrinks it sets up a rigid outer shell which cannot further shrink because of its hardened and rigid condition. The hardened material forms a more or less impermeable membrane which retards or prevents the loss of moisture and the hardening of the center of the mass.

After castings of hardened material as heretofore produced are left in the oven, say until their weight has become constant, it will be found that upon cutting the casting in two and placing the cut sections again in the oven, they will begin to disintegrate from the cut section. This result has been the cause of the failure of the materials prepared by many of the prior workers.

A principal object of the present invention is to prepare improved urea-formaldehyde reaction masses by a process or processes which are easily controlled to repeatedly yield uniform high-grade cast or molded products, particularly those which are polymerized without being hydrated and especially those of crystal-clear nature.

It is a further object of the invention to provide an intermediate resin which is relatively elastic, which has relatively great tensile strength and which is capable of being readily worked, machined and fabricated into various articles employed in commerce, in the arts and in industry.

Other objects and advantages of the invention will become apparent from the following description.

In accordance with the present invention I have found that the tendency of cast resins to crack and the difficulties of preparing large batches of the cast material are due to what I term "hydration." According to my colloidal concept there are two kinds of water present particularly when formalin has been employed; one is the solvent water, and the other is the water which is held in a physical or colloidal union by the reaction product. As the particles polymerize or associate, during the course of the reaction into larger particles before gelatinization occurs, they occlude, or, in some other manner take up large amounts of water.

I have found that the greater the degree of hydration, the greater is the instability of the solution or tendency to gelatinize during the removal of water, which removal may be effected by vacuum distillation or by boiling at atmospheric pressure. In the prior art methods such instability often leads to the reaction mass unavoidably changing into an infusible state removable from the evaporator or still only by a laborious operation, the avoidance of gelatinization becoming more and more difficult as the water is removed, even when the operation is carried out under a vacuum at a low temperature.

Excessive hydration of the reaction mass as obtained by prior processes prevents the production of satisfactory products because this water of hydration is removable substantially only after a gelatinization has occurred, or during the hardening process. The removal of the large quantity of hydrated water while the mass is being hardened, causes fatal shrinkage and cracking. If the reaction mass is of too low acidity or the reaction time-temperature factor kept too low, then the water of reaction becomes water of hydration during the setting, and the same poor results are obtained.

Now I have discovered a method of controlling hydration and of preventing any objectionable amount of the same, which method is operable even when the reaction is carried out in the presence of aqueous formaldehyde, the water of which in addition to that formed by the reaction tends to increase hydration. This method consists in carrying the condensation stage only to such an extent that there will be no clouding of the final product and at the same time no unnecessary hydration. This is accomplished during the condensation stage by forming particles only of such size that they will not precipitate or cloud upon cooling or in other words will constitute a colloidal solution of the reaction product having resinous properties, but not sufficiently large as to cause any appreciable hydration. The ascertainment of such size may be gained by physical measurements such as viscosity, a rise of which shows the beginning of hydration. As soon as the initial viscosity increase is noticed, as much water as is possible is removed while preferably maintaining the reaction under neutral, alkaline or low acid conditions or under conditions of temperature and time which retard hydration. Other physical measurement may be used to determine the desired point of the condensation such as refractive index, surface tension, etc. Proceeding in this manner, a liquid resin of unusual stability is obtained which yields greatly improved final products. The process gives complete control over the production of large batches of material and the pH value of the final liquid product after removal of water can be carried to low pH values which are desirable in order to speed up the hardening process without danger of premature gelatinization.

Control of hydration allows the preparation of a cast resin in which hydration has taken place to a minimum degree. As hydration is reduced, thus allowing the removal of more water, it will be found that the final product will show less and less strain, less tendency to case harden and therefore to crack. Accordingly, in addition to the control of the reaction, it is one of the prime purposes of this invention to reduce hydration to the minimum so that strains and therefore cracking will be eliminated.

By controlling and reducing hydration and removing larger percentages of water, a further advantage has been obtained, that is the stability of the intermediate liquid resin is greatly increased. It may be kept at ordinary temperatures, for considerable periods of time without danger of gelatinization and upon heating is quickly converted into the insoluble, infusible product. This property is clearly an advantage over those made by prior processes, since such resins tended to spontaneously gelatinize after short periods of time.

The three prime factors which control the reaction of urea and formaldehyde from the initial reaction to the final hardening are—the acidity, the temperature, the time. In order to carry the reaction just to the point where there is no hydration and at the same time obtaining a clear final product the control of these three factors is essential.

Theoretically the product of these three factors must be a constant; in other words, the factors must be correlated when any one factor is set. Prior workers have not recognized the importance of all three factors and their relationship, or have not utilized them to obtain the products which are obtained by the present invention.

The mere knowledge, however, that these factors must be correlated is insufficient to enable one to obtain satisfactory or commercial results for the reason that different constants must be maintained at different periods of the process, and for the additional reason that pH values change of their own accord frequently without the knowledge of the operator. For example, a urea-formaldehyde mixture to which sufficient ammonia has been added to produce a basic solution, immediately upon heating to boiling becomes quite acidic. Likewise, solutions of say a pH 6.5 containing sodium hydroxide upon boiling drop to a pH of 5.7.

The preparation of commercially usable urea-formaldehyde condensation products particularly in large batches presents many difficulties. The problem of obtaining uniform results as between successive batches and of avoiding failures is of extreme importance in the preparation of commercial products. This difficulty arises as a result of the necessity for reacting urea and formaldehyde (particularly aqueous formaldehyde which is used because it is the most convenient and cheapest form) in the presence of an acid catalyst. Such catalyst must be used to cause the reaction to go to completion in a reasonable time, and in order to improve the stability of the final product. Up to the present time the acid has been incorporated in such a manner as to cause the viscosity of the reacting solution and the extent of reaction to vary considerably as the reaction progresses or during the removal of water, such water being that of the aqueous formaldehyde used and/or that formed by the reaction.

Prior operators recognizing the necessity for high utility of acids to accelerate the reaction, condensation and hardening of the final product have introduced acid substances at various stages during the reaction and distillation steps. Some have carried out the initial reaction of urea and formaldehyde under highly acidic conditions, the acidity being carried over into the final resinification reaction. Others have carried out the initial reaction under low acidic conditions and added acid just before the vacuum distillation is carried out. Also, others have added acid to the reaction mass almost at the completion of the vacuum distillation. In the case of molding compositions, acid substances or potentially acidic substances have been added or ground with the dried composition.

Prior methods have the objection that very little control over the amount of hydration is accomplished, with the result that the varying degrees of hydration obtained have led to lack of uniformity in the products and as well to the production of inferior products which shrink and crack upon molding or upon aging. Where the acidity is high during the vacuum distillation the uncontrolled increase in viscosity and hydration often leads to the gelatinization of the mass before much of the water is removed. The production of stable glass-clear products from prematurely gelatinized or hydrated masses cannot be accomplished because of the shrinkage and strains set up in the final material as the water is evaporated out. If the acidity is kept low during the condensation and vacuum distillation, the condensation does not proceed sufficiently far to liberate all the water of reaction, which water if left to be formed in the mass is only partially removed during curing. Products produced in this way are not fully polymerized and their stability against boiling water is low. Molding compositions of low acidity having acid substances incorporated in them before molding liberate large amounts of water during molding, such water producing hydrated masses which on the loss of the water shrink and may crack.

Another object of the invention is to react urea and formaldehyde at an acidity which advances the reaction at a rate or to an extent which liberates as far as possible all water of reaction before gelatinization occurs, and which leads to a molding or casting composition of sufficient acidity to set or harden into a solid, tough insoluble product within a reasonable time, but which acidity is insufficient at any time during the process to cause hydration and a shrinking and cracking of the final hard mass. Various methods of obtaining proper acidic conditions in accordance with the present invention are set out in the description as well as in the specific examples hereinafter disclosed.

In my United States Patent No. 1,893,911, I disclosed what I considered to be the reaction between urea and formaldehyde by the following equation:

$$4CH_2O + 2NH_2CONH_2 \rightleftarrows C_5H_{10}O_3N_4 + CH_2O + 2H_2O$$

In my later experimentation this formula appears to be correct but does not show the intermediate reactions which I now believe occur.

In an effort to make the present invention clear, but without any intention of limiting it in any sense whatsoever, I set out below my theory of the complete reaction between urea and formaldehyde when practiced in accordance with the invention.

1. $2CH_2O + NH_2CONH_2 \rightleftarrows C_3H_8O_3N_2$

2. $X(C_3H_8O_3N_2) \rightleftarrows (C_3H_6ON_2)_{x-1} \cdot C_3H_8O_3N_2 + 2XH_2O$ 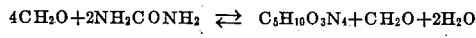

3. $Y(C_3H_6ON_2)_{x-1} \cdot C_3H_8O_3N_2 \rightleftarrows (C_5H_{10}O_3N_4)_{xy} + YCH_2O$ 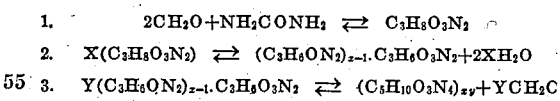

According to my beliefs as represented by the above reactions, Formula No. 1 represents the initial reaction of 2 moles of formaldehyde to 1 of urea forming dimethylol urea. When the proper reaction conditions are applied, a condensation occurs in accordance with Formula No. 2 wherein a number of molecules join and liberate two molecules of water for each molecule of dimethylol urea which condenses. Further reaction treatment, in accordance with Formula No. 3 causes condensed molecules to associate or polymerize further into larger molecules with the liberation of formaldehyde.

The whole reaction is one of equilibrium and is shifted to the right the greater the acidity of the reacting solution. In order to complete the reaction in any reasonable length of time, an acid must be employed. In accordance with the present invention, however, the amount of acid added, or the degree of acidity must be maintained sufficiently low to prevent hydration as will be more clearly explained.

In order to make the invention more readily understandable, I describe below substantially the whole process of manufacture insofar as it affects the results of the present method. In some cases the prior art practice is disclosed to illustrate the contrast more clearly. It should be understood, however, that in actual practice and as evidenced by the specific examples herein disclosed, several of the various stages may overlap each other or be carried out simultaneously or in what appears to be a single or simultaneous treatment.

The stages are as follows: (1) initial reaction; (2) condensation; (3) polymerization or association; (4) removal of water; (5) gelatinization; and, (6) hardening.

THE INITIAL REACTION STAGE

When urea and formaldehyde solution are mixed, an initial reaction commences forming dimethylol urea or some other simple addition product of the two ingredients, the rate of the reaction being accelerated by heating and also dependent upon the acidity prevailing. At a boiling temperature, i. e., about 100° C. or a little lower and a pH value of about 6 to 7, the reaction takes only a few minutes. At lower temperatures the time of reaction must be increased.

The proportions of formaldehyde and urea employed do not constitute any part of the present invention, but may be employed generally in proportions of 2 moles of formaldehyde to about 1 to 1.50 moles of urea. If a glass-clear final product is desired, it is fairly essential that the formaldehyde be used in proportions as high as 2 moles to 1 mole of urea. Under the same conditions the greater the proportion of urea the more rapidly will the liquid intermediate products gelatinize and harden while on the other hand the more difficult will be the control of the colloidal conditions to obtain a clear transparent product. Furthermore, the acidity should be at a pH value greater than 5 and preferably greater than 6 during the boiling, for when lower values are employed the reaction mass becomes milky or cloudy a short time after the boiling begins. If opaque final products are to be formed as by the use of fillers, slightly lower acidities may be used without endangering the stability or infusibility properties.

THE CONDENSATION STAGE

This stage occurs when the dimethylol urea formed during the initial reaction stage condenses with itself liberating water. It commences immediately after the formation of the dimethylol urea and its extent is controlled by proper regulation of the acidity, temperature and time of treatment, which factors must be correlated to obtain satisfactory results. Theoretically any pH value may be used during this stage, but practically it should not be lower than pH 4, for below this value the reaction proceeds so rapidly that it cannot be easily controlled. At a pH of 7 the reaction proceeds so slowly that it can be completed only after 15 to 20 hours of boiling. The reaction is preferably carried out at a boiling temperature because of the ease at which the temperature is maintained constant.

After the initial reaction stage, or at the beginning of the condensation stage, the pH value may be lowered somewhat by the addition of acid without producing the cloudiness which would result if high acid conditions prevailed during the initial reaction stage. In order to force the condensation to occur at as rapid a rate as possible, it is desirable that the acidity be adjusted to or maintained at as low a pH as possible, but it must not be lowered to a degree which causes hydration. Since the permissible degree of acidity varies a great deal dependent upon other factors including the amount of water present, no definite limits can be given here. The time of treatment during the condensation stage must be sufficient to cause substantially all of the initial reaction product to condense and give off water such that this water of reaction will not remain to be liberated only after gelatinization has occurred. Furthermore, if the reaction is not caused to progress to a sufficiently great degree, the final hardened products will not be stable against weathering and boiling water. The curing action in the oven or hot mold will not produce stable final products unless a sufficiently high acidity, temperature and time product is employed.

During the condensation stage the molecules, apparently of dimethylol urea, condense with loss of water to form a colloidal solution or sol which will not precipitate on cooling. It is probable that the colloidal nature of the solution is due directly to the gigantic size of the molecules which are formed from the small molecules of dimethylol urea or other similar condensation product of urea and formaldehyde. If the condensation reaction is not carried sufficiently far, and if the water is removed before the reaction is complete, a considerable amount of unchanged dimethylol urea remains. My observations indicate that the molecules of dimethylol urea condense to give off water and if unchanged dimethylol urea is permitted to remain the mass contains a proportion of potential water which is liberated in the molding operation, thus retarding or preventing the infusible insoluble product from being formed. Therefore, between under-reaction and hydration a definite and proper extent of reaction exists and must be obtained in order that final products of value may be produced.

THE POLYMERIZATION

During this stage the molecules formed in the condensation stage polymerize or associate to form larger molecules or chains by combining with one another. The commencement of this stage in a urea-formalin reaction under reflux condensation is indicated by an increase in viscosity of the solution, which increase should not be confused with that which results from the removal of water in processes not carried out under reflux condensation. When the reaction is carried out at boiling temperatures under reflux condensation, the increase in viscosity provides a clear indication of the commencement of polymerization. The increase in viscosity is accompanied by the liberation of formaldehyde thereby indicating a different type of polymerization or association from that occurring during the reaction stage. Polymerization possibly continues from this point in the process through the removal of water, the gelatinization and hardening of the final mass. Operation in accordance with the present invention attempts to delay the polymerization until after as much as possible of the water of reaction and of solution have been eliminated, for polymerization in the presence of water apparently causes hydration.

REMOVAL OF WATER

In the production of glass-clear cast material the removal of water is most satisfactorily accomplished by means of vacuum distillation. Other methods may be employed such as by spray drying, by ordinary distillation, or by mixing the liquid solution with a filler such as alpha cellulose and passing a stream of heated air through a bed of the impregnated filler. With each method of drying, the acidity, temperature and time must be correlated and excesses avoided.

Inasmuch as it is essential that casting liquids and molding compositions at the time of use be of acid reaction it is permissible and desirable in accordance with one embodiment of the present invention to increase the acidity during the removal of water. The lesser the amount of water present during drying the greater the permissible acidity.

Where vacuum distillation is employed, such treatment is continued until the solution becomes as viscous as possible while retaining sufficient fluidity to permit pouring into a mold and the elimination of bubbles before gelatinization occurs.

The condensation, the initial polymerization, and the removal of water can be carried out simultaneously in accordance with another embodiment of the present invention. In such case acid may be added either before and/or during the removal of water. The amount of water formed by the condensation decreases as the reaction proceeds and during the time when the major part of the water is formed or still present, the acidity should be as low as possible to prevent hydration, but at the same time sufficiently high to cause the condensation to progress to such an extent that the colloidal solution formed will not precipitate or cloud on cooling as is illustrated by the specific examples hereinafter set out. If a glass-clear product is not required, somewhat lower acidities may be employed, for a slight precipitation is not detrimental in such case. The intensity of acidity permissible at any particular period of the distillation has been found dependent upon and limited by the amount of water present. I have found that a very satisfactory method of ascertaining the amount of water removed and the readiness of the mass for additional acid is by the use of an ordinary immersion hydrometer. At any specified pressure or temperature at which water is removed, the proper rate of adding acid in relation to the increase in specific gravity can be easily determined.

Because the present process prevents hydration, the removal of water can be carried to a point where the mass has a specific gravity in excess of 1.30 or as high as 1.36 without danger of gelatinization before casting. If the liquid mass, however, is permitted to stand for a comparatively long period of time or is heated, gelatinization will occur. The removal of water and other volatiles reduces the original weight of the solution by 50% or more. I consider this comparatively stable casting liquid having a high specific gravity and free of a very large proportion of both the water of solution and of formation a novel product and to constitute a feature of the present invention.

GELATINIZATION

Gelatinization occurs when the sol or liquid urea-formaldehyde condensation product changes into a gel in the solid state. The viscous liquid obtained from the vacuum distillation may be gelatinized after being poured into a mold simply by warming in an oven. Alternatively, the solution may be gelatinized at room temperature by increasing the amount of acid in the solution. It is possible also to carry out the removal of water under such acidic conditions that the viscous mass will spontaneously gelatinize. The addition of acids just before gelatinization is desirable not only to accelerate the gelatinization, but also to aid in the curing action in the mold to produce infusible, stable final products.

The addition of acid to the viscous mass produced by the present invention leads to a different result from the same step when applied to viscous masses produced by prior processes. In the prior processes the addition of acid causes the mass to case harden, in which case the surface loses water during the hardening operation and forms an impermeable membrane which imprisons the water in the core and prevents complete hardening in the center of the mass with the result that strains are set up in the mass which sooner or later cause the hardened material to crack and disintegrate. The product of the present invention is uniform throughout and does not case harden.

HARDENING STAGE

The urea-formaldehyde resins upon casting or molding pass through four distinct stages before becoming infusible.

1. A soft jelly of little strength which is readily torn and disintegrated by boiling water.
2. A hard, tough gel of great mechanical strength having excellent machining properties but softened by boiling water.
3. A hard brittle solid with little mechanical strength affected by boiling water, but less than in stage 2.
4. A tough horn-like material of great mechanical strength, infusible and insoluble.

Although the products produced by the prior art probably pass through these four stages, the length of time such masses remain in each period is considerably different from that experienced by proceeding in accordance with the present invention. In prior products the hardening did not occur uniformly throughout the whole mass. The surfaces of the mass were always one or two steps ahead of the center, with the result that fatal stresses and strains were set up. The present product, however, hardens substantially homogeneously and may be maintained in the second stage for indefinite periods of time by employing a low acidity in the mass before gelatinization. The product in stage 2 has excellent machining qualities and after fabrication may be hardened into the final product by heating in an oven at about a temperature of 65° C. for a period of several hours to 2 or 3 days. The material in the second stage possesses properties similar to the present phenolic cast material such as that sold under the trade-mark of "Catalin" but is considerably clearer. Since the castings which remain in stage 2 are free from case hardening and therefore strain, they can be utilized without any further hardening for general indoor purposes without danger of cracking. The relative elasticity and lack of brittleness of this product make it possible to work, machine and fabricate the same with relatively great facility. For example, it may be sawed in various ways without chipping or cracking. It can be turned or formed to any shape on lathes or milling machines in which operations the cut material comes off in the form of ribbons, a property which distinguishes it from prior urea-formaldehyde products. Prior materials when turned on a lathe cut off in the form of small chips or pieces. The present product when in stage 2 has an additional novel property of becoming more flexible immediately upon raising its temperature, thereby facilitating the production of articles of odd shapes of commerce. Continued heating, of course, advances the hardening to stages 3 and 4.

*Example 1*

Seven and one-half kgs. of urea were dissolved in 20 liters of commercial formalin, the pH of which had previously been brought to 6.5 by the addition of sodium hydroxide. The solution was heated to boiling in a still fitted with a reflux condenser and was refluxed for about 20 minutes. At this time heating was discontinued and 5 cc. of formic acid added to bring the pH to a value of 4.3. Heating was then resumed until there was a slight change in viscosity which was observed by the use of a small pipette which was filled with the solution and its time of emptying noted. Immediately upon notation of an increase of the time at which the emptying and hence the time of initial increase of viscosity occurs, the heating was discontinued and sufficient sodium hydroxide solution added to bring the pH value up to about 7, thus neutralizing the acceleration effect of the acid catalyst. The solution was then filtered to remove any foreign matter for clarification purposes. The specific gravity of the solution at this point was 1.14. In order to remove the water the solution was then submitted to vacuum distillation, the still being heated preferably by means of a water bath. Distillation was continued until the mass became so viscous that it would flow only with difficulty. At this point the specific gravity had increased to about 1.36. The solution, after removal from the still, constituted a liquid casting composition which was exceedingly stable and could be kept for a long period of time without gelatinization. Although a thin skin formed on the surface of the mass, the main body of the resin remained unchanged. This liquid was satisfactorily utilized for simple castings, in molding compositions, as a laminating solution, and as a coating composition.

In order to speed up the gelatinization and hardening 30 cc. of a 10% solution of formic acid may be stirred in the viscous mass giving a pH value of about 4.5. If the material is to be cast it is poured into molds where it may be hardened satisfactorily at a temperature of about 65° C. until it gives an insoluble, infusible product resistant to boiling water.

It will be noted that acid is added after the initial reaction stage or at the beginning of the condensation stage, which procedure is effected for the purpose of speeding up the reaction so as to shorten the time of condensation. At the completion of the condensation the acid solution is neutralized so as to stop the condensation and growth of the size of the molecules. The extremely slight increase in viscosity does not cause sufficient hydration to affect seriously the properties of the hardened product. The increase in viscosity is permitted only because the pipette method is a rapid and practical means of indicating substantially the correct point for termination of the reaction.

Example 2

The same proportions of urea and formaldehyde are used as in Example 1. After the materials were mixed the pH value was adjusted to neutrality and there maintained throughout the process by the addition of the necessary amount of alkali solution. The reaction mass was then heated to boiling and refluxed until a sample did not cloud on cooling, which reaction required about 15–20 hours. When measured with the viscosity pipette used in Example 1, no measurable change in viscosity was found. The solution was filtered and vacuum distilled as in Example 1 until a specific gravity of 1.365 was obtained. The resulting liquid resin was exceedingly stable and possessed equally good if not better properties than the product obtained by Example 1.

By this procedure the fact is illustrated that the condensation stage may be carried out under slightly alkaline or neutral conditions as well as under acid conditions. An increase in the pH value therefore requires an increase in the time of reaction. The low rate of growth of the particles during the twenty hour heating makes it possible to stop the reaction at a point where there is no hydration, no clouding on cooling and yet no change in viscosity.

Example 3

The same proportions and process as used in Examples 1 and 2 were employed to prepare the viscous liquid resin with the exception that during the vacuum distillation and before the mass had appreciably thickened 10 pounds of glycerine were added, after which the distillation was continued as before. When a specific gravity of 1.36 was obtained the pH value was adjusted to 6 by the addition of any acid, formic acid being suitable, after which the material was poured into molds constructed of lead or any other suitable material. After hardening for several days at 65° C. the mass became a tough, hard gel which was plastic when hot, but rigid when cold. This product was suitable for use in the production of many kinds of articles such as novelties, buttons, beads, etc. This product is in stage 2 of the hardening steps and may be easily machined and fabricated.

Example 4

One hundred and fifty grams of urea were added to and dissolved in 400 cc. of 40% U. S. P. formalin and the mixture was heated to boiling in an open beaker during vigorous stirring. After boiling had commenced, the pH value of the solution was 8.4 and the specific gravity measured by a hydrometer was 1.13. When the specific gravity became 1.19 due to the continued boiling and evaporating of the solution the pH value was adjusted to 6.2 by the addition of any suitable acid, for example, formic acid or oxalic acid. Boiling was continued until the specific gravity of 1.26 was reached when the pH was lowered to a value of 4.3. Upon further evaporation, the solution became very viscous and possessed a specific gravity of approximately 1.29 (at about 100° C.). By this procedure a final product having a clear glass-like appearance was obtained which when cast quickly gelatinized due to the high heat employed in evaporating off the water and other volatiles. This product although inferior to that obtained in Example 1, principally because the quick gelatinization caused the trapping of many bubbles, was suitable for utilization as, for example, in molding compositions or opaque casting masses.

In the method of this example, the initial reaction, condensation and removal of water were carried out in one continuous treatment. By boiling the solution at or near atmospheric pressure and simultaneously removing water, no clouding of the solution occurred as would have been obtained if the mass were vacuum distilled at the lower temperatures ordinarily employed. The addition of acid in the manner described accelerates the formation of colloidal particles, but at the same time removes the objectionable quantities of water which if permitted to remain would cause hydration of the mass.

Example 5

Five pounds of paraform were mixed with 2 pounds of cellosolve and the mixture then acidified with acetic acid in a quantity which produced a pH value of roughly 5 when a portion of the mass was dissolved in distilled water. This mixture was then heated to the boiling point and during continual heating 5 pounds of urea dissolved in 1 pound of cellosolve was slowly added. Boiling was continued for a short time and the solution then neutralized with triethanolamine. In order to remove any undissolved material, the solution was filtered while hot. In accordance with one of the procedures of the present invention a small amount of formic acid was added to the solution to slightly acidify the same. Boiling was continued until the water formed by the acid was eliminated after which more acid was added and the boiling continued. These steps were repeated until the acidity of a test portion in distilled water gave a pH value of 3.8. A stable highly polymerized glass-clear product was obtained which could be employed in the same manner as the material produced in accordance with Example 1.

This example illustrates that the present invention can be applied to solid forms of formaldehyde and that organic solutions may be employed. In the process of this example, hydration is substantially wholly prevented. The water removed during the boiling operation is that formed by the condensation of the dimethylol urea or similar addition product. This water of condensation must be removed before gelatinization just as the water of solution from the use of formalin must be removed and at an acidity insufficiently high to cause hydration.

Example 6

Three hundred grams of urea were dissolved in 800 cc. of 40% formalin and the pH value adjusted to 7.5 by adding any suitable alkali. The solution was heated under a reflux condenser until spontaneous ebullition had ceased at which time if the solution were allowed to cool it would become milky in appearance almost immediately. This mass was then distilled under a high vacuum, about 730 mm. of mercury, until the specific gravity as indicated by the hydrometer read 1.20 at which time the pH was lowered to a value of 6.0. Vacuum distillation was continued until the specific gravity reached 1.27 when the pH value was lowered to 4.0. The vacuum distillation was resumed and continued until the specific gravity reached approximately 1.36 when the distillation was discontinued. The final solution after bringing the pH value to 6.5 though possessing a cloudy appearance was exceedingly stable and could be kept almost indefinitely without gelatinizing. It is suitable for admixture with alpha cellulose or other fillers to produce molding compositions or it may be dissolved in any suitable solvent and employed for impregnating sheets of cellulose compositions, which upon heating produce a hard, stable infusible product.

From this example it will be observed that it is not necessary that the liquid resin be reacted under conditions which produce a clear liquid if the same is to be used in the preparation of molding compositions containing fillers. For the production of resins of this nature it is therefore not necessary that the initial condensation reaction be carried just to the point where the mass is clear. The avoidance of hydration is made more certain if the solution will cloud after the heat treatment is effected to cause condensation. It is necessary in such case to see only that the condensation stage is carried sufficiently far to condense substantially all of the dimethylol urea produced by the initial reaction.

In certain of my earlier applications hereinafter enumerated, I have recognized that water of hydration is responsible for much of the poor results obtained by prior processes and have described therein specific methods of reducing hydration, the present application being a continuation-in-part as to such matter.

In my copending application Serial No. 429,202, filed February 17, 1930, I disclose a method involving reacting urea and formaldehyde at a low temperature (30° C.) for a short time (30 min.) in a slightly acid solution pH (6.5) in the presence of potentially acidic substances. The resulting condensation product is then mixed with a fibrous filler and dried first by means of a stream of dry air when sufficient water is removed whereupon it is heated to a higher temperature until dried.

In my copending application Serial No. 664,208, which is a continuation-in-part of my earlier application Serial No. 422,545, filed January 22, 1930, I disclose a method of removing water from an acid condensation product of urea and formaldehyde at a low temperature so that the reaction will not materially progress. In this partial drying operation by blowing with air at ordinary room temperatures to partially dry before heat is applied, the amount of water in the composition is materially decreased thereby lessening hydration, and the composition is thus rendered less sensitive to the action of heat during the drying operation even though a comparatively large amount of acid catalyst is present.

In my copending application Serial No. 684,561, filed August 10, 1933, Patent No. 2,140,561, I disclose a method of preparing condensation products in such a manner that as much of the water present or formed is removed as soon as possible either before or during the reaction and drying process so as to reduce or prevent hydration.

In these copending applications the problem of retarding or avoiding hydration is recognized and to some extent accomplished, but it is not as completely controlled as by the present process. The avoidance of hydration in the clear products or products without fillers is much more difficult than in products containing absorbent fillers such as cellulose.

Although specific proportions and materials have been disclosed in the examples herein set out, it should be understood that the invention is not in any sense limited thereto. In view of the fact that the acids employed serve only to acidify the reacting mass, all acids, acid salts and acid compounds are within the scope of the invention. Latent catalysts may be employed to increase the acidity during casting or molding, but are not necessary. Likewise, the invention includes the use of any basic material for neutralization purposes providing the change in pH value of the reacting mass is taken into account. Fillers, coloring matters, plasticizers, resins, of any kind may be added to the final mass before casting or molding or to any intermediate mass for altering or improving its properties.

Instead of urea, thiourea or substitution products of urea or of thiourea may be used insofar as they are not specifically excluded by their peculiar properties, all of which substances, I wish to be included along with urea in the designation "urea" used in the following claims. The formaldehyde, unless otherwise specified may be used either in the commercial aqueous solution or in the gaseous state, or in the form of a solution of anhydrous formaldehyde, or in the form of its polymers. Various changes may be made in the details disclosed in the foregoing specification without departing from the invention or sacrificing the advantages thereof, and the appended claims are to be interpreted with this fact in mind.

I claim:

1. The process of producing a stable glass-clear cast urea-formaldehyde condensation product comprising initially reacting urea and formalin in a proportion of about 1 mol to 2 mols respectively by boiling for a period of a few minutes at a pH value above about 4.8 to produce a clear solution, condensing said product by boiling under reflux condensation within correlated pH value-time ranges of a pH value of from about 3.8 for a period of about 5 minutes to a pH value of 7 for a period of about 20 hours to a point where an increase in viscosity is imminent, but before any appreciable increase in viscosity occurs evaporating off the water present by vacuum distillation under substantially neutral conditions until a viscous slowly flowing mass is obtained, casting said mass and heating the same until a hard tough gel is obtained.

2. In the production of urea-formaldehyde condensation products, the combination of steps which comprises reacting urea and formaldehyde in aqueous solution to an extent equivalent to boiling a 2 to 1 molar ratio of formaldehyde to urea for a period of about 5 minutes at a pH value of about 3.8 at which point condensation is complete and polymerization is imminent, then removing the water present under conditions which do not advance the reaction and cause appreciable polymerization, whereby a resinous reaction product is obtained capable of producing a uniform, tough elastic final reaction product.

3. The process of producing a glass-clear urea-formaldehyde condensation product suitable for castings, moldings, laminating solution and coating compositions, which comprises initially reacting urea and formalin in a proportion within the range of 1–1.5 mols of urea to 2 mols of formaldehyde capable of producing a clear solution upon reaction, said reaction being carried out by subjecting the said substances to boiling for a period of a few minutes at a pH value at a point above about 4.8, condensing the resulting product by reacting to an extent equivalent to boiling a 1 to 2 molar ratio under reflux condensation within correlated pH value-time ranges within a period of about five minutes at a pH value of about 3.8 to a period of 15 to 20 hours at a pH value of about 7 where an increase in viscosity is imminent and where a sample of the product on cooling will remain clear and before any appreciable increase in viscosity occurs evaporating off the water present under neutral to mildly acid conditions until a viscous slowly flowing mass is obtained.

4. In the production of urea-formaldehyde condensation products, the combination of steps comprising reacting urea and formalin to produce an initial reaction product, condensing said product to an extent equivalent to boiling a 2 to 1 molar ratio of formaldehyde to urea for a period of about five minutes at a pH value of about 3.8 thereby liberating water of reaction, said condensation reaction being continued substantially to the point at which an increase in viscosity of the solution occurs due to an increase in the size of molecules of the condensed product, then immediately lowering the acidity to a point at which further reaction is retarded and removing the water present under such conditions thereby producing a mass substantially free of occluded water.

5. A resinous urea-formaldehyde condensation product substantially free of water of hydration, said product being substantially identical with that obtained by reacting urea and formaldehyde, condensing the reaction mass to an extent equivalent to that obtained by boiling a 2 to 1 molar ratio of formalin to urea for a period of about five minutes at a pH value of about 3.8, at which polymerization is imminent and removing water present before any increase in viscosity occurs due to advancement of the reaction, substantially all water formed during the condensation reaction having been removed before the molecules have increased to such size as otherwise would prevent removal of the water only after rigidity and hardening have occurred.

6. The process of producing clear urea-formaldehyde condensation products substantially free of both potential and free water which comprises reacting and condensing formalydehyde and urea in the molar ratio of about 2 to 1 for a period equivalent to boiling an aqueous mass of the given proportions for 15 to 20 hours at an acidity repeatedly adjusted to a pH value of 7, the reaction period being insufficient to cause any material increase in viscosity due to an increase in the size of the molecules formed, whereby a substantially completely condensed colloidal reaction mass is obtained which is not cloudy on cooling, then evaporating off substantially all of the water present under acidity-temperature conditions which do not materially advance the reaction.

7. A stable, clear, substantially completely condensed reaction product of urea and formaldehyde substantially free of combined water substantially identical with that obtained by reacting urea and formaldehyde in a molar ratio within the range of 1–1.5 mols of urea to 2 mols of formaldehyde and advancing the reaction and condensation an amount equivalent to condensing a reaction mass of a 1 to 2 molar ratio of urea and formalin at a temperature of boiling for a period of 15 to 20 hours at a pH value repeatedly brought to about 7, and before there is any substantial increase in viscosity observable by test as to the time of emptying a pipette filled with the condensed solution, arresting the reaction by lowering the temperature-acidity factor and then removing substantially all of the water present under conditions which do not materially advance the reaction.

LEONARD SMIDTH.